United States Patent
Kummamuru

(10) Patent No.: US 8,875,136 B2
(45) Date of Patent: Oct. 28, 2014

(54) METHODS OF PERSONALIZING SERVICES VIA IDENTIFICATION OF COMMON COMPONENTS

(75) Inventor: Krishna Kummamuru, Hyderabad (IN)

(73) Assignee: International Business Machines Corporation, Armonk, NY (US)

( * ) Notice: Subject to any disclaimer, the term of this patent is extended or adjusted under 35 U.S.C. 154(b) by 458 days.

(21) Appl. No.: 12/944,935

(22) Filed: Nov. 12, 2010

(65) Prior Publication Data
US 2012/0124592 A1     May 17, 2012

(51) Int. Cl.
*G06F 9/50*     (2006.01)
*G06Q 10/00*    (2012.01)
*G06Q 10/06*    (2012.01)
*H04L 29/08*    (2006.01)

(52) U.S. Cl.
CPC ........ *G06F 9/5055* (2013.01); *G06Q 10/06311* (2013.01); *H04L 67/327* (2013.01)
USPC .......... 718/100; 718/102; 718/104; 705/7.11; 705/7.12; 705/7.13

(58) Field of Classification Search
None
See application file for complete search history.

(56) References Cited

U.S. PATENT DOCUMENTS

| | | |
|---|---|---|
| 7,386,465 B1 | 6/2008 | Friedland et al. |
| 2008/0209428 A1* | 8/2008 | Baryshnikov et al. ........ 718/104 |
| 2010/0023799 A1 | 1/2010 | Garbow |

OTHER PUBLICATIONS

Taura et al., "A Heuristic Algorithm for Mapping Communicating Tasks on Heterogeneous Resources" 2000, IEEE Computer Society Press.*
"Impact of Service-Oriented Architectures (SOA) on Business Process Standardization—Proposing a Research Model", 17th European Conference on Information Systems, Verona, Italy, Jun. 8-10, 2009.
Jain, A.K., et al., "Data Clustering: A Review," ACM Computing Surveys (CSUR), Sep. 1999, pp. 264-323, vol. 31, No. 3, ACM, New York, New York, USA.

* cited by examiner

*Primary Examiner* — Qing Wu
(74) *Attorney, Agent, or Firm* — Ference & Associates LLC

(57) ABSTRACT

Methods and arrangements for more efficiently enhancing the personalization and customization of services while avoiding an undue overburdening of personnel, infrastructure or resources. An input service component comprising a plurality of tasks is assimilated, similarity among the tasks is determined, and output service components are routed to resources based on similarity among the tasks, the service components each comprising a subgroup of similar tasks.

13 Claims, 3 Drawing Sheets

METHODS OF PERSONALIZING SERVICES VIA IDENTIFICATION OF COMMON COMPONENTS

BACKGROUND

Generally, in service industries that do not necessarily require in-person service (e.g., accounting, remote diagnosis of computer problems, customer service in general), the quality of a service is perceived to be high if the service is personalized. However, especially given the possibility of geographically diffuse departments and centers handling different aspects of a service request, a greater infusion of resources and infrastructure is usually needed in order to deliver personalized services. As such, it is often difficult to balance the attendant costs or investment with a meaningful increase in such personalization.

BRIEF SUMMARY

In summary, one aspect of the invention provides a method comprising: assimilating an input service component comprising a plurality of tasks; determining similarity among the tasks; and routing output service components to resources based on similarity among the tasks, the one or more service components comprising a subgroup of similar tasks.

Another aspect of the invention provides an apparatus comprising: one or more processors; and a computer readable storage medium having computer readable program code embodied therewith and executable by the one or more processors, the computer readable program code comprising: computer readable program code configured to assimilate an input service component comprising a plurality of tasks; computer readable program code configured to determine similarity among the tasks; and computer readable program code configured to route output service components to resources based on similarity among the tasks, the one or more service components comprising a subgroup of similar tasks.

An additional aspect of the invention provides a computer program product comprising: a computer readable storage medium having computer readable program code embodied therewith, the computer readable program code comprising: computer readable program code configured to assimilate an input service component comprising a plurality of tasks; computer readable program code configured to determine similarity among the tasks; and computer readable program code configured to route output service components to resources based on similarity among the tasks, the one or more service components comprising a subgroup of similar tasks.

For a better understanding of exemplary embodiments of the invention, together with other and further features and advantages thereof, reference is made to the following description, taken in conjunction with the accompanying drawings, and the scope of the claimed embodiments of the invention will be pointed out in the appended claims.

DETAILED DESCRIPTION

Figure 1:
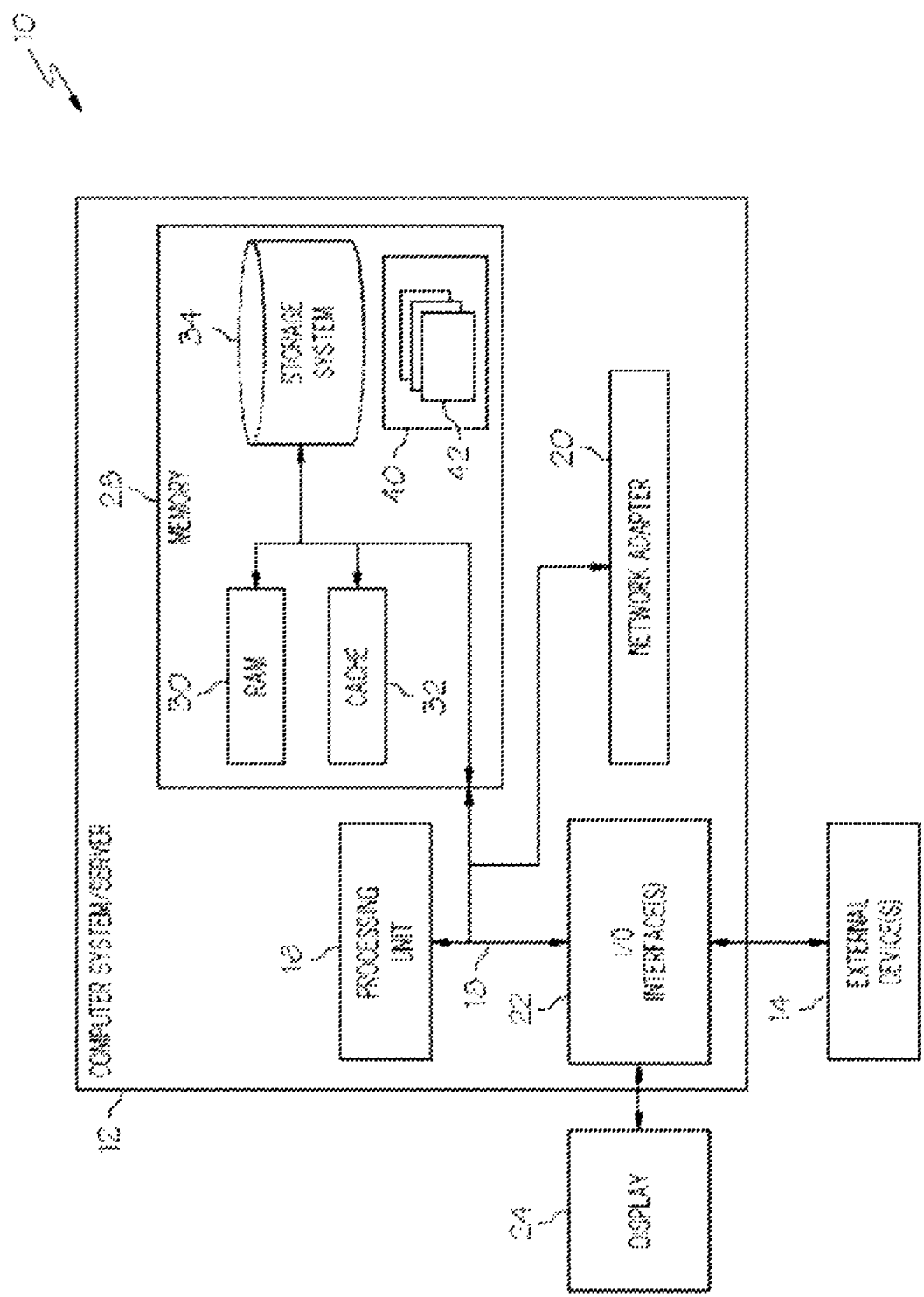
FIG. 1 illustrates a computer system.

It will be readily understood that the components of the embodiments of the invention, as generally described and illustrated in the figures herein, may be arranged and designed in a wide variety of different configurations in addition to the described exemplary embodiments. Thus, the following more detailed description of the embodiments of the invention, as represented in the figures, is not intended to limit the scope of the embodiments of the invention, as claimed, but is merely representative of exemplary embodiments of the invention.

Reference throughout this specification to "one embodiment" or "an embodiment" (or the like) means that a particular feature, structure, or characteristic described in connection with the embodiment is included in at least one embodiment of the invention. Thus, appearances of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of embodiments of the invention. One skilled in the relevant art will recognize, however, that the various embodiments of the invention can be practiced without one or more of the specific details, or with other methods, components, materials, et cetera. In other instances, well-known structures, materials, or operations are not shown or described in detail to avoid obscuring aspects of the invention.

The description now turns to the figures. The illustrated embodiments of the invention will be best understood by reference to the figures. The following description is intended only by way of example and simply illustrates certain selected exemplary embodiments of the invention as claimed herein.

It should be noted that the flowchart and block diagrams in the figures illustrate the architecture, functionality, and operation of possible implementations of systems, apparatuses, methods and computer program products according to various embodiments of the invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via I/O interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
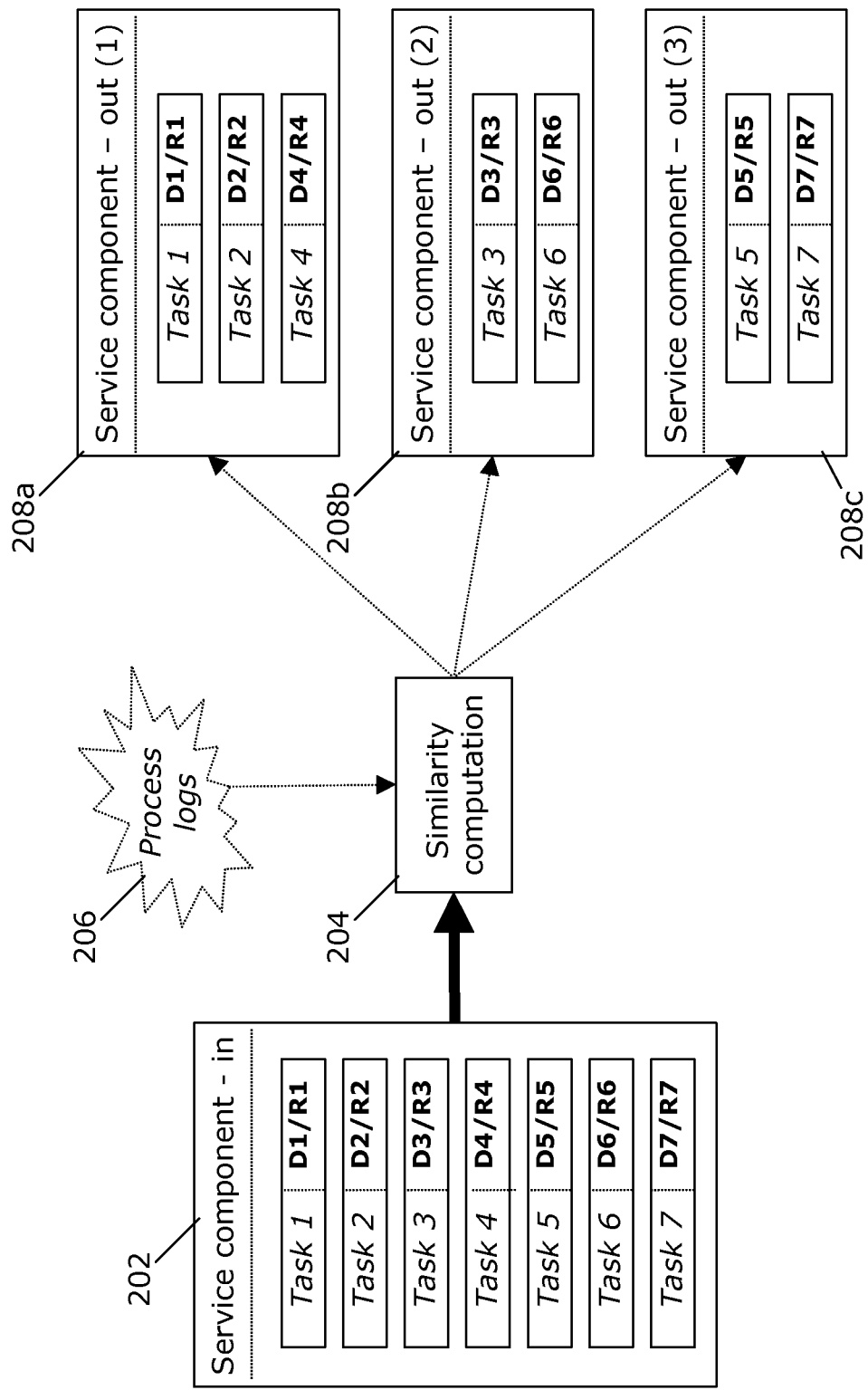
FIG. 2 schematically illustrates an arrangement for assimilating and regrouping service components.

The disclosure now turns to FIG. 2. It should be appreciated that the processes, arrangements and products broadly illustrated therein can be carried out on or in accordance with essentially any suitable computer system or set of computer systems, which may, by way of an illustrative and non-restrictive example, include a system or server such as that indicated at 12 in FIG. 1. In accordance with an example embodiment, most if not all of the process steps, components and outputs discussed with respect to FIG. 2 can be performed or utilized by way of a processing unit or units and system memory such as those indicated, respectively, at 16 and 28 in FIG. 1, whether on a server computer, a client computer, a node computer in a distributed network, or any combination thereof.

Generally, in service industries that do not necessarily require in-person service, service is delivered via fulfilling a service request. The service request may be submitted, for instance, telephonically to a customer service agent, via email, or via other arrangements. Often, the service request is forwarded to other personnel and/or another destination via an electronic "ticket" that assigns a dedicated name or number to the request and that sets forth the request in writing, via a form (e.g., with check boxes, etc.), or via other arrangements easily discernible to the next recipient(s). The personnel or destination so receiving a ticket initially may often represent but one of several sequential steps or tasks that may need to be traversed, while the steps or tasks might be performed manually (e.g., via input from a service individual at a computer) or automatically (e.g., via software that automatically runs upon being prompted such as via receipt of a ticket that can automatically trigger such a run).

Given the sequences of tasks that are performed by a service organization, there are broadly contemplated herein, in accordance with at least one embodiment of the invention, methods and arrangements for more efficiently enhancing the personalization and customization of such services while avoiding an undue overburdening of personnel, infrastructure or resources.

In accordance with at least one embodiment of the invention, a service component is recognized as a sub-sequence of tasks. A process in accordance with at least one embodiment of the invention helps in efficiently delivering personalized service by identifying components that are common to many of the service requests that come in. More particularly, an assumption is made is that a sequence of tasks constituting a service request can be broken into components which can be independently performed, e.g. at different geographic locations and/or by different personnel, thus lending enhanced efficiency in terms of the additional focus and/or expertise and/or more streamlined allocation of personnel, infrastructure and resources that can be brought to each such task.

In accordance with at least one embodiment of the invention, the process accepts as input a specification of various types of service requests, as well as a corresponding sequence of tasks for fulfilling the service request. This specification is indicated as service component 202 in FIG. 2. In accordance with the example embodiment shown in FIG. 2, a sequence of Tasks 1-7 make up the service request, and each Task 1-7 includes corresponding descriptions (D1-D7, respectively) and an indication of resources (R1-R7) needed to complete the task. Resources R1-R7 broadly convey people and other resources that may be required to perform a task, and may also include an indication of effort (e.g., person-hours) needed to complete the task (which in turn may include a target number of person-hours for task completion and/or a historical record or average of person-hours needed for the task at hand or a similar task), as well as location constraints (if any need to be specified). Individual task descriptions D1-D7 can include any and all elements or descriptors that might be needed or helpful in identifying or describing a task, such as a short statement, keywords, a coded expression that conveys the type of task, logs generated while performing the task, etc. As deemed warranted, either or both of the sets of parameters D1-D7 and R1-R7 may include any other pertinent practical information that is germane to task execution and completion. The grouping of tasks is done not only by considering the tasks in the individual request, but also by ascertaining their similarity with respect to a predefined cluster of tasks, itself obtained from analyzing a large number of other related service requests.

In accordance with at least one embodiment of the invention, the process provides as output service components wherein tasks that are similar are identified and then there is identified at least a largest subsequence of tasks in the input set of sequences of tasks that can performed by one resource, group of resources, or type of resource. Accordingly, a similarity computation 204, in accordance with at least one embodiment of the invention, employs process logs 206 to discover service components 202a/b/c. Essentially, a search is conducted with the assistance of process logs 206. Similarity is then computed on the basis of task descriptions D1-D7 and/or resource information R1-R7. If both elements task descriptions D1-D7 and resource information R1-R7 are employed, thus providing a two-dimensional problem, relative weights are assigned to task descriptions D1-D7 as a group and resource information R1-R7 as a group, and/or to individual parameters within each of those two broad groupings. If only one such grouping (D1-D7 or R1-R7) is employed, then relative weights may still be assigned to elements within each grouping. In accordance with at least one embodiment of the invention, weights are determined by heuristics on a case-by-case basis; as such, weights may be configured with respect to factors would contribute to the optimization of service delivery operations.

In accordance with at least one embodiment of the invention, the process continues via outputting service components 208a/b/c which group tasks based on similarity. Thus, in the example embodiment of FIG. 2, a first output service component 208a assigns Tasks 1, 2 and 4 to a first resource (or group of resources), a second output service component 208b assigns Tasks 3 and 6 to a second resource (or group of resources), and a third output service component 208c assigns Tasks 5 and 7 to a third resource (or group of resources). At this stage, after similarity is computed (204), essentially any suitable clustering algorithm may be employed to provide the output service components 208a/b/c/. Examples of such clustering algorithms include, but by no means are limited to, K-Means, K-Medoid and Hierarchical Agglomerative algorithms. For background purposes, many such algorithms are discussed, for example, in Jain, A. K., Murty, M. N., and Flynn, "Data clustering: a review," ACM Comput. Surv. 31, 3 (September 1999), 264-323.

In accordance with at least one embodiment of the invention, an algorithm may proceed as outlined herebelow.

Let there be M requests, wherein each request is a sequence of tasks:

Service Request $R_1 = t_{11}, t_{12}, \ldots, t_{1n1}; \ldots$

Service Request $R_M = t_{M1}, t_{M2}, \ldots, t_{MnM}$;

Define a similarity function, S, between two tasks based on the objective. Similarity can depend on the description of the task, place of performing the task, resource requirements, etc.

Cluster the tasks (t's) using the similarity function to obtain $C_1, \ldots, C_K$ clusters.

Now represent the Service Requests, $R_1$ to $R_M$, as a sequence of cluster labels $C_1, \ldots, C_K$ Let $R_i' = \{c_{ij}\}, c_{ij} \in \{C_1, \ldots, C_K\}$.

Find the frequently occurring subsequences in $\{Ri'\}$.

These subsequences represent the service components, or subsequences of task that can be performed by similar resources.

Figure 3:
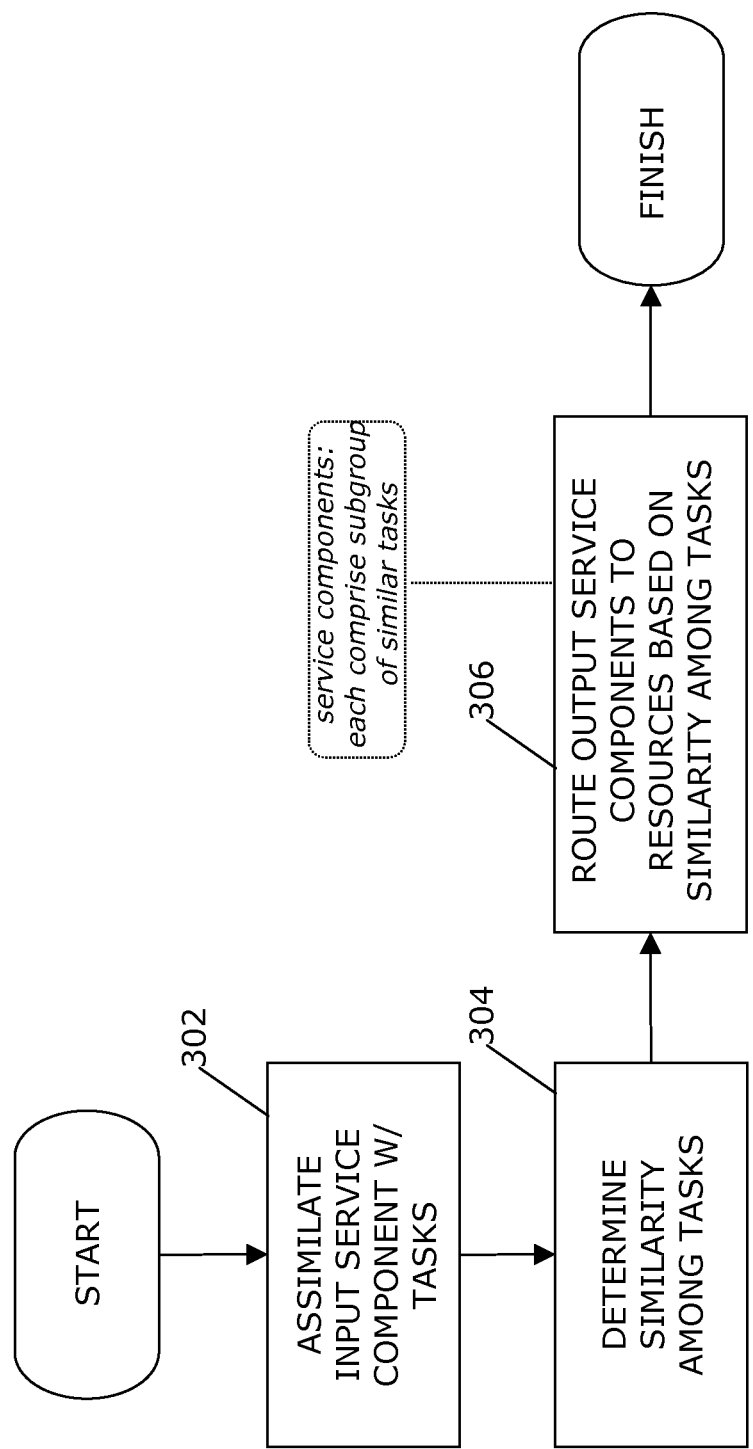
FIG. 3 sets forth a process more generally for assigning tasks to resources.

FIG. 3 sets forth a process more generally for assigning tasks to resources, in accordance with at least one embodiment of the invention. It should be appreciated that a process such as that broadly illustrated in FIG. 3 can be carried out on essentially any suitable computer system or set of computer systems, which may, by way of an illustrative and on-restrictive example, include a system such as that indicated at 12 in FIG. 1. In accordance with an example embodiment, most if not all of the process steps discussed with respect to FIG. 3 can be performed by way a processing unit or units and system memory such as those indicated, respectively, at 16 and 28 in FIG. 1.

As shown in FIG. 3, an input service component comprising a plurality of tasks is assimilated (302). Similarity among the tasks is determined (304), and output service components are routed to resources based on similarity among the tasks (306), the service components each comprising a subgroup of similar tasks.

It should be noted that aspects of the invention may be embodied as a system, method or computer program product. Accordingly, aspects of the invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list)

of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wire line, optical fiber cable, RF, etc., or any suitable combination of the foregoing.

Computer program code for carrying out operations for aspects of the invention may be written in any combination of one or more programming languages, including an object oriented programming language such as Java®, Smalltalk, C++ or the like and conventional procedural programming languages, such as the "C" programming language or similar programming languages. The program code may execute entirely on the user's computer (device), partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

This disclosure has been presented for purposes of illustration and description but is not intended to be exhaustive or limiting. Many modifications and variations will be apparent to those of ordinary skill in the art. The embodiments were chosen and described in order to explain principles and practical application, and to enable others of ordinary skill in the art to understand the disclosure for various embodiments with various modifications as are suited to the particular use contemplated.

Although illustrative embodiments of the invention have been described herein with reference to the accompanying drawings, it is to be understood that the embodiments of the invention are not limited to those precise embodiments, and that various other changes and modifications may be affected therein by one skilled in the art without departing from the scope or spirit of the disclosure.

What is claimed is:

1. A method comprising:
utilizing at least one processor to execute computer code configured to perform the steps of:
assimilating at least one service request, each service request comprising a plurality of tasks;
said assimilating comprising assimilating, for each task, a description and an indication of one or more resources needed to complete the task;
determining similarity between different ones of the tasks, via a similarity function based on the descriptions of the tasks and on the indications of one or more resources need to complete the tasks;
wherein said determining comprises searching process logs to assist in determining similarity between different ones of the tasks;
employing a clustering algorithm to form clusters of tasks based on similarity determined between different ones of the tasks and on compatibility with at least one resource; and
routing output service components to resources, each of the output service components comprising at least one formed cluster of tasks.

2. The method according to claim 1, wherein said routing comprises identifying a largest subsequence of tasks assignable to one or more taken from the group consisting of: a single resource; a group of resources; and a type of resource.

3. The computer program product according to claim 1, wherein the indication of one or more resources includes one or more taken from the group consisting of: a type of resource for performing a task; an estimated time for task completion by a given resource; and a location constraint.

4. The computer program product according to claim 1, wherein said determining of similarity via a similarity function comprises
applying a collective weight to factors relating to the description of each task and a collective weight to factors relating to the one or more resources needed to complete the task.

5. The computer program product according to claim 1, wherein said determining of similarity via a similarity function comprises applying individual weights to factors relating to the description of each task.

6. The computer program product according to claim 1, wherein said determining of similarity via a similarity function comprises applying individual weights to factors relating to the indication of one or more resources needed to complete the task.

7. An apparatus comprising:

one or more processors; and a computer readable storage medium having computer readable program code embodied therewith and executable by the one or more processors, the computer readable program code comprising:

computer readable program code configured to assimilate at least one service request, each service request comprising a plurality of tasks;

wherein to assimilate comprises assimilating, for each task, a description and an indication of one or more resources needed to complete the task;

computer readable program code configured to determine similarity between different ones of the tasks, via a similarity function based on the descriptions of the tasks and on the indications of one or more resources need to complete the tasks;

wherein to determine comprises searching process logs to assist in determining similarity between different ones of the tasks;

computer readable program code configured to employ a clustering algorithm to form clusters of tasks based on similarity determined between different ones of the tasks and on compatibility with at least one resource; and computer readable program code configured to output service components to resources, each of the one or more output service components comprising at least one formed cluster of tasks.

8. A computer program product comprising:

a non-transitory computer readable storage medium having computer readable program code embodied therewith, the computer readable program code comprising:

computer readable program code configured to assimilate at least one service request, each service request comprising a plurality of tasks;

wherein to assimilate comprises assimilating, for each task, a description and an indication of one or more resources needed to complete the task;

computer readable program code configured to determine similarity between different ones of the tasks, via a similarity function based on the descriptions of the tasks and on the indications of one or more resources need to complete the tasks;

wherein to determine comprises searching process logs to assist in determining similarity between different ones of the tasks;

computer readable program code configured to employ a clustering algorithm to form clusters of tasks based on similarity determined between different ones of the tasks and on compatibility with at least one resource; and computer readable program code configured to output service components to resources, each of the one or more output service components comprising at least one formed cluster of tasks.

9. The computer program product according to claim 8, wherein said computer readable program code is configured to identify a largest subsequence of tasks assignable to one or more taken from the group consisting of: a single resource; a group of resources; and a type of resource.

10. The computer program product according to claim 8, wherein the indication of one or more resources includes one or more taken from the group consisting of: a type of resource for performing a task; an estimated time for task completion by a given resource; and a location constraint.

11. The computer program product according to claim 8, wherein said computer readable program code is configured to determine similarity via a similarity function via applying a collective weight to factors relating to the description of each task and a collective weight to factors relating to the one or more resources needed to complete the task.

12. The computer program product according to claim 8, wherein said computer readable program code is configured to determine similarity via a similarity function via applying individual weights to factors relating to the description of each task.

13. The computer program product according to claim 8, wherein said computer readable program code is configured to determine similarity via a similarity function via applying individual weights to factors relating to the indication of one or more resources needed to complete the task.

* * * * *